United States Patent [19]

Cox

[11] 4,304,029
[45] Dec. 8, 1981

[54] OYSTER PROCESSING METHOD

[76] Inventor: James P. Cox, 246 E. Bartlett Rd., Lynden, Wash. 98264

[21] Appl. No.: 19,240

[22] Filed: Mar. 9, 1979

Related U.S. Application Data

[62] Division of Ser. No. 773,187, Mar. 1, 1977, Pat. No. 4,143,444.

[51] Int. Cl.³ .............................................. A22C 29/04
[52] U.S. Cl. .................................................. 17/48
[58] Field of Search ......................... 17/74, 75, 76, 48

[56] References Cited

U.S. PATENT DOCUMENTS

| | | | |
|---|---|---|---|
| 1,228,383 | 6/1917 | Abbate | 17/76 |
| 1,499,965 | 7/1924 | Beyerle | 17/74 |
| 1,683,113 | 9/1928 | Whelan | 17/74 |
| 2,047,688 | 7/1936 | Jenkins | 17/74 |
| 2,473,608 | 6/1949 | Plock | 17/75 X |
| 2,473,609 | 6/1949 | Plock | 17/74 |
| 2,784,447 | 3/1957 | Thompson et al. | |
| 2,879,538 | 3/1959 | Peuss | 17/48 |
| 3,007,801 | 11/1961 | Lapeyre et al. | 17/48 |
| 3,375,547 | 4/1968 | Reinke | 17/71 |
| 3,528,124 | 9/1970 | Wenstrom et al. | 17/74 |
| 3,594,860 | 7/1971 | Nelson et al. | 17/74 |
| 3,988,805 | 11/1976 | Martin | 17/48 |
| 4,004,321 | 1/1977 | Harrison | 17/71 |

Primary Examiner—Willie G. Abercrombie
Attorney, Agent, or Firm—Robert W. Beach; Ward Brown

[57] ABSTRACT

A declustering component breaks clusters of oysters into individual oysters and an opening component separates oyster half shells thereby exposing the meat of the oysters. The declustering component includes a rotatable drum having a feed opening for oyster clusters and slots which permit only single oysters to leave the drum. The opening component includes mechanical means for disconnecting the oyster half shells by applying opposed shearing forces adjacent to the shell joint.

5 Claims, 28 Drawing Figures

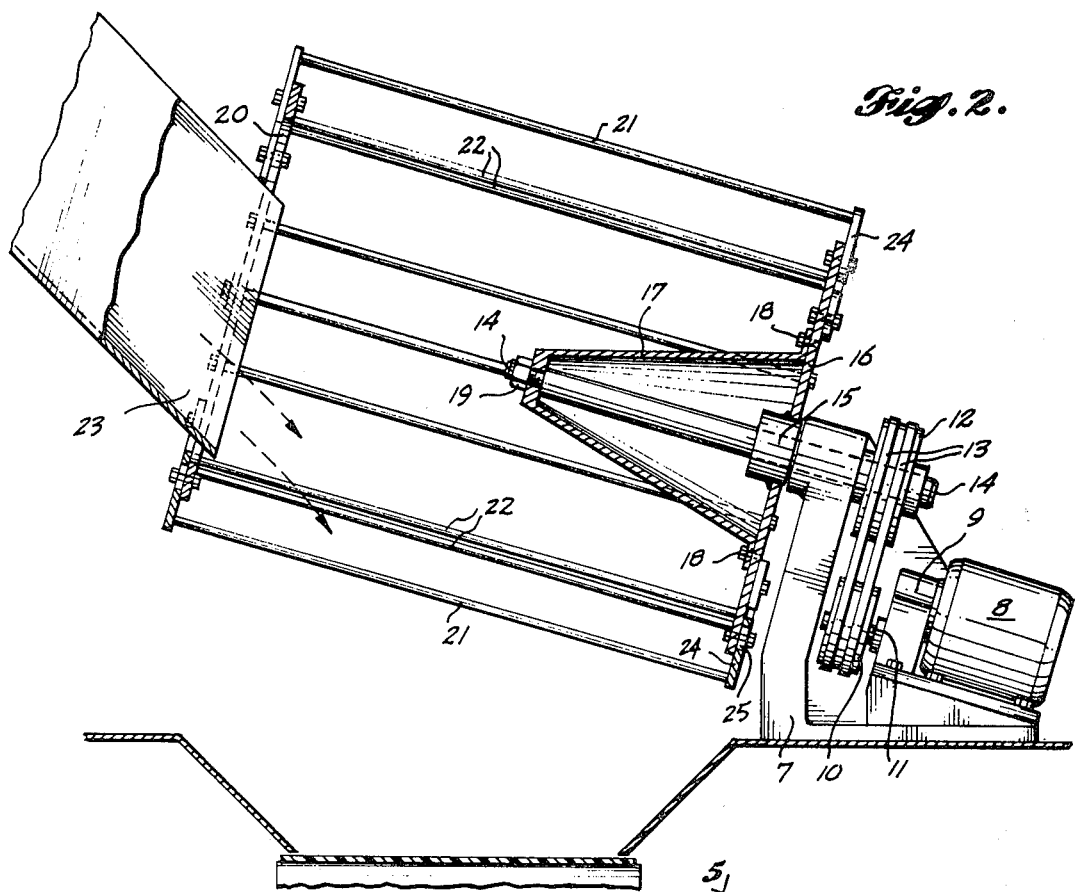
*Fig. 2.*
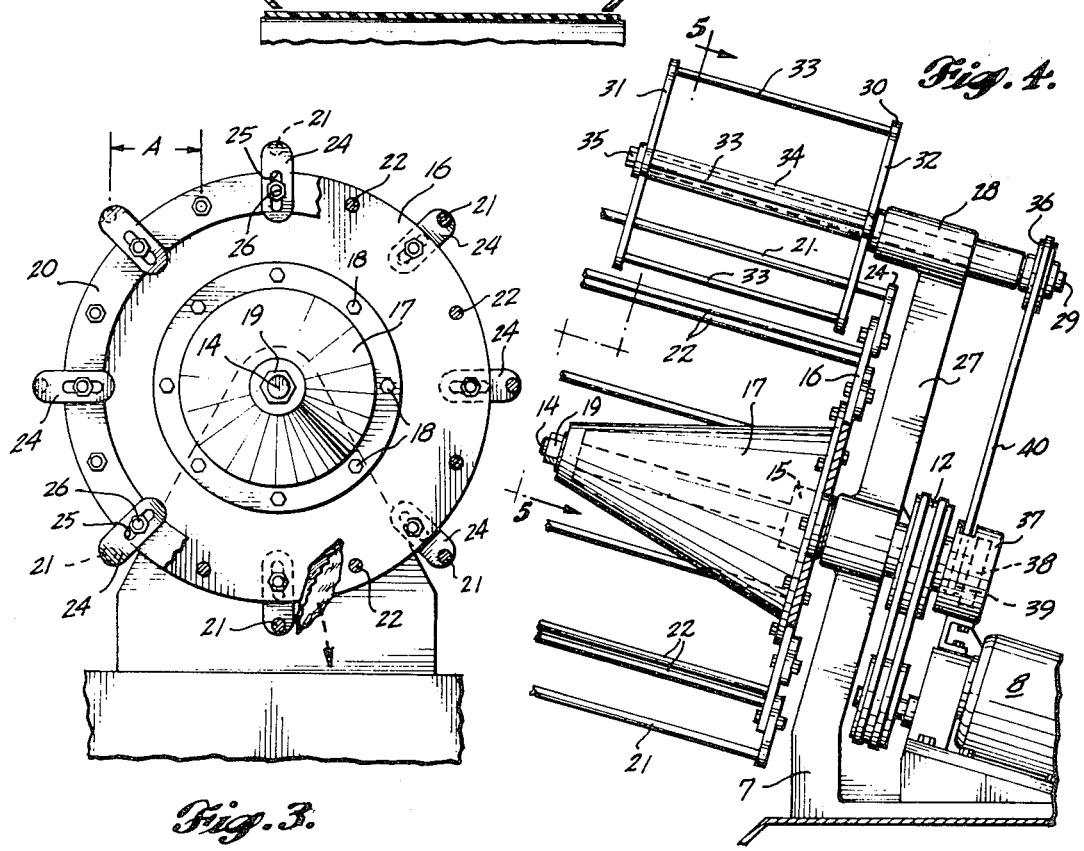
*Fig. 3.*
*Fig. 4.*

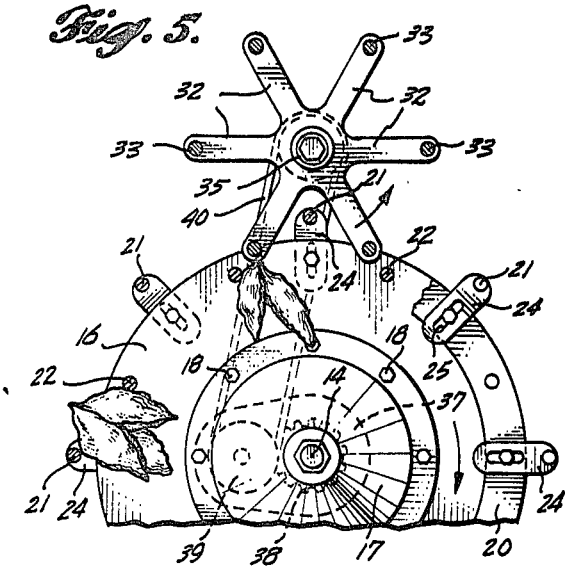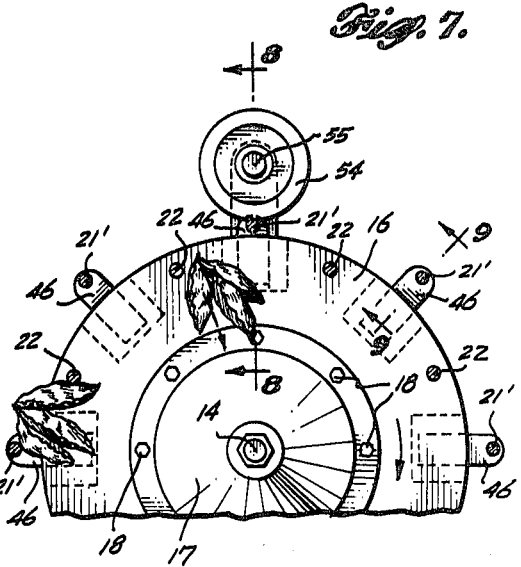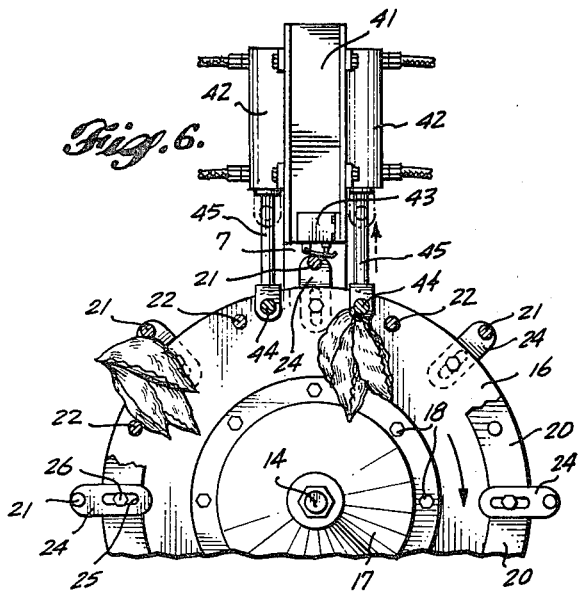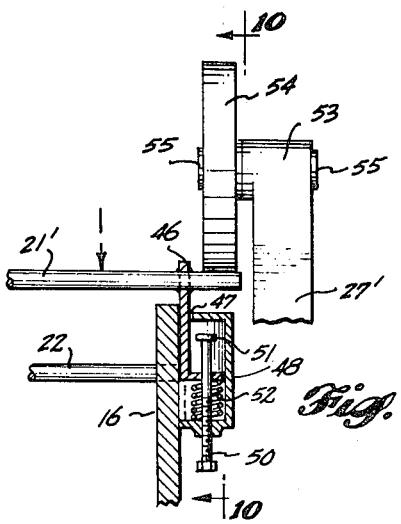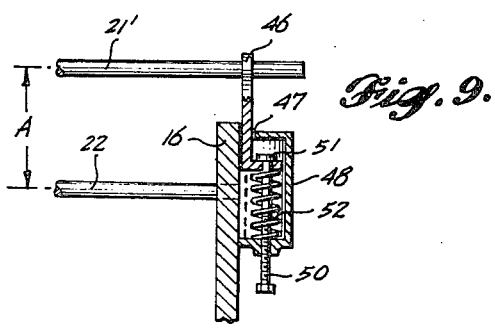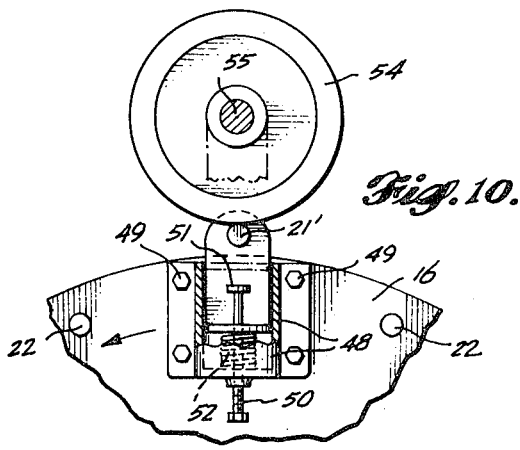

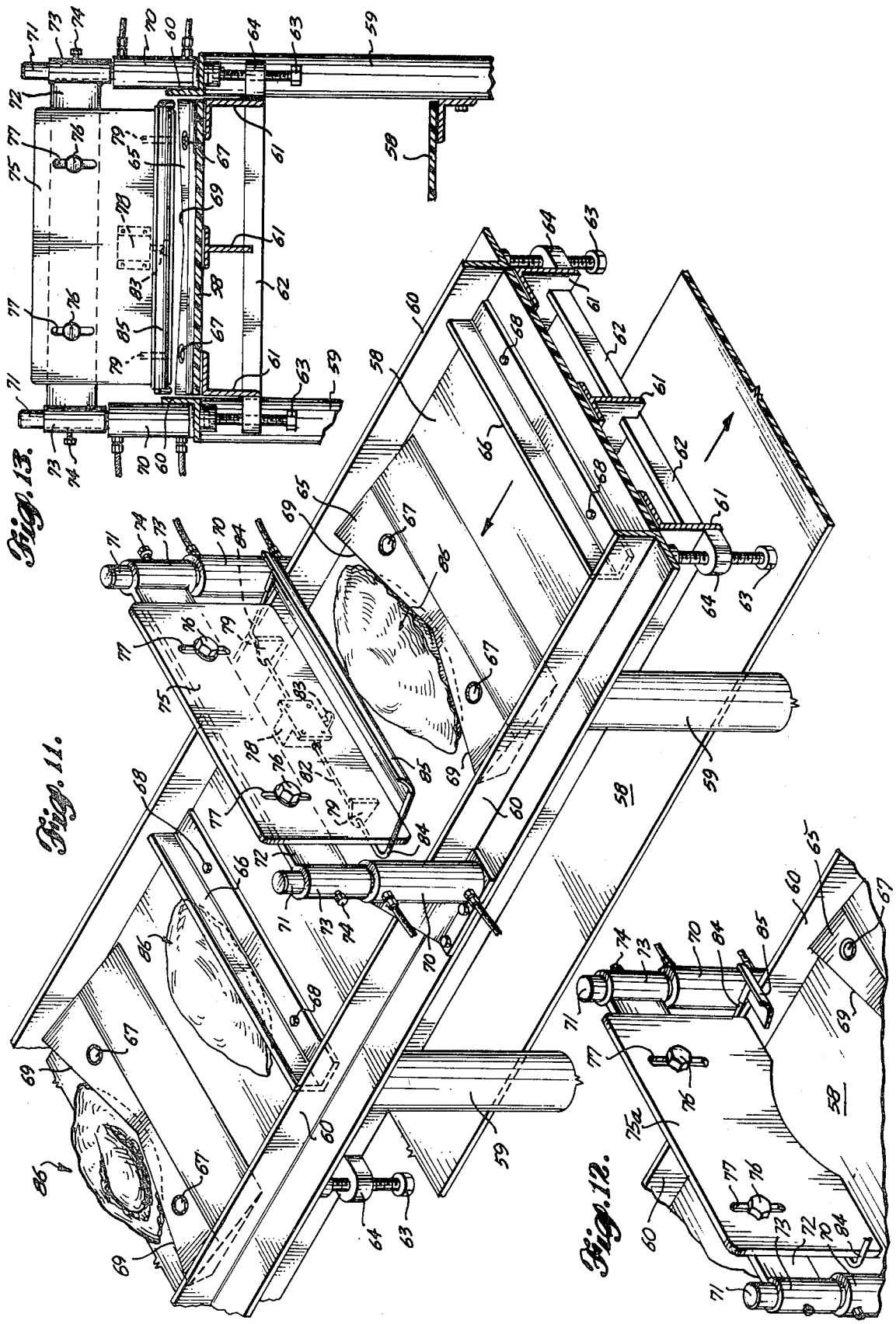

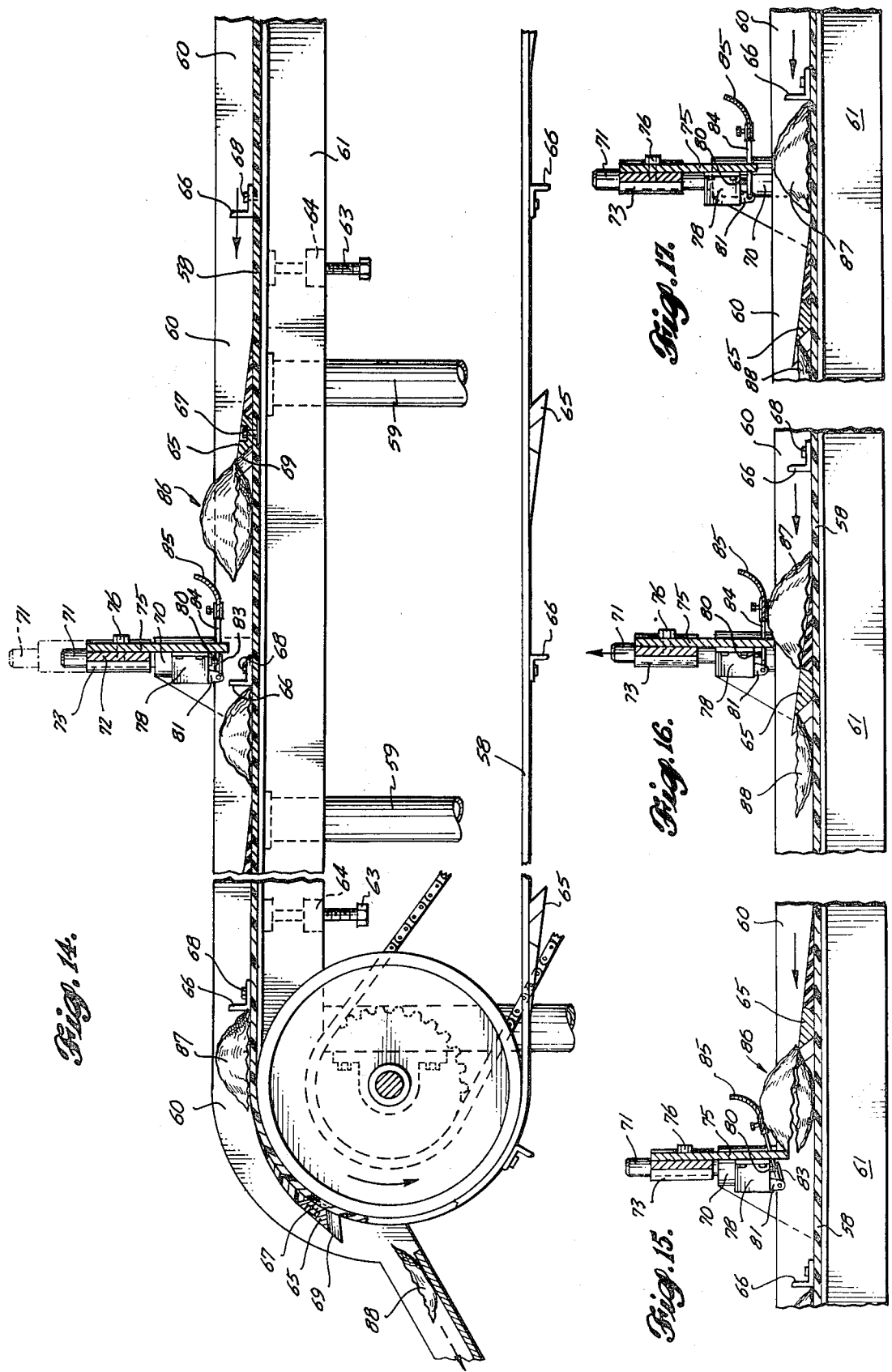

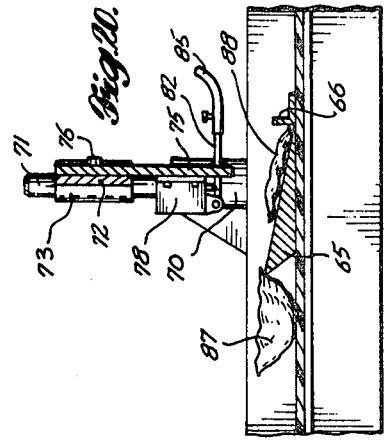
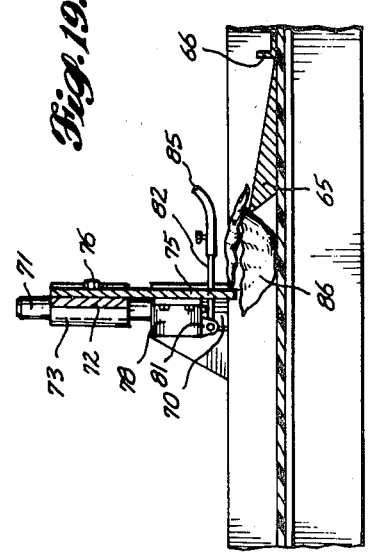
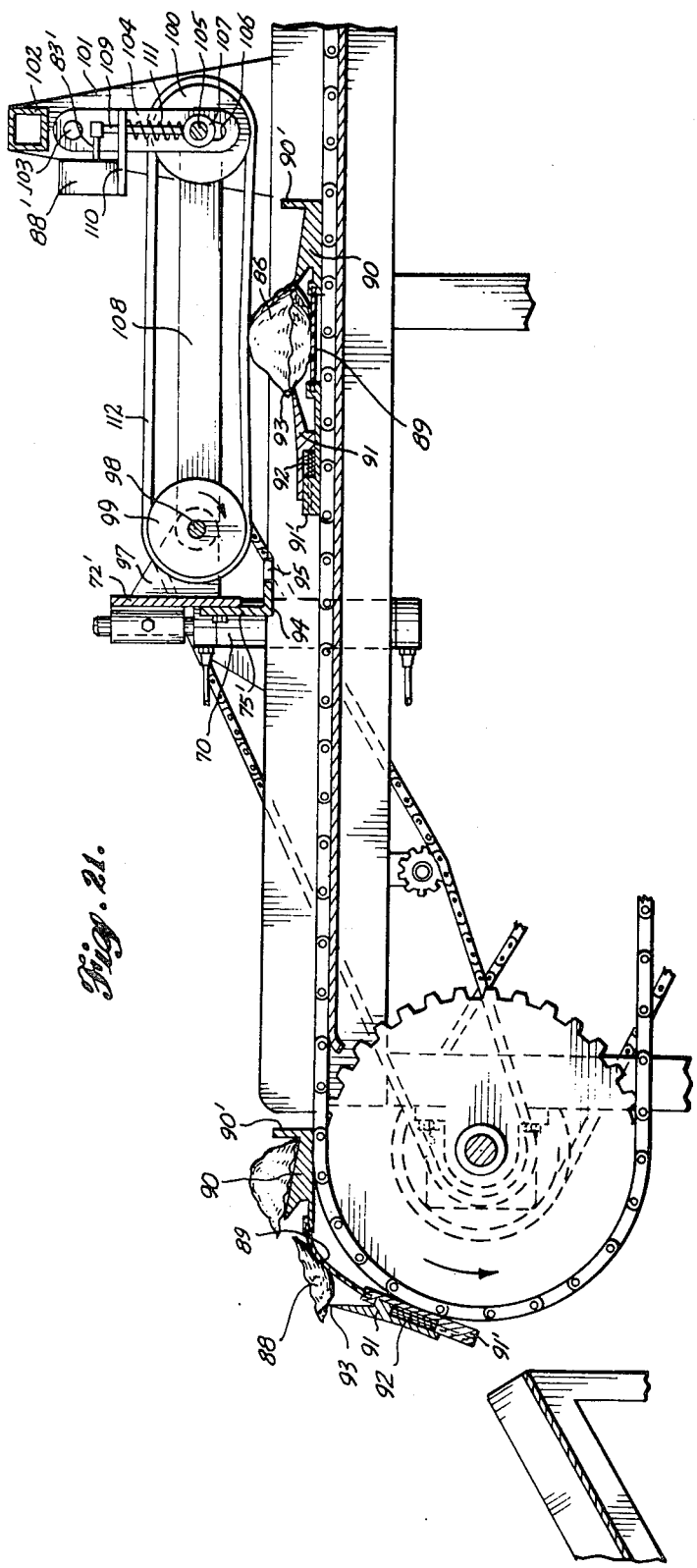
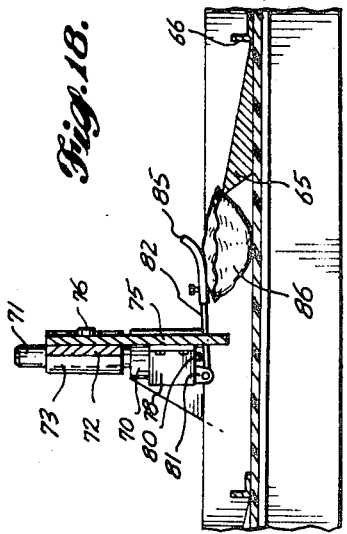

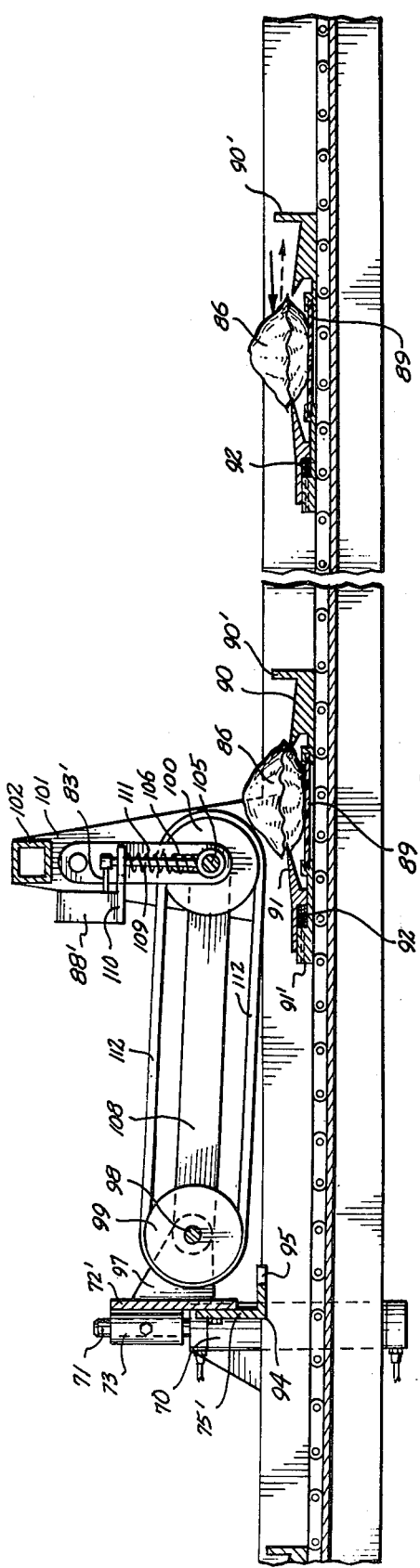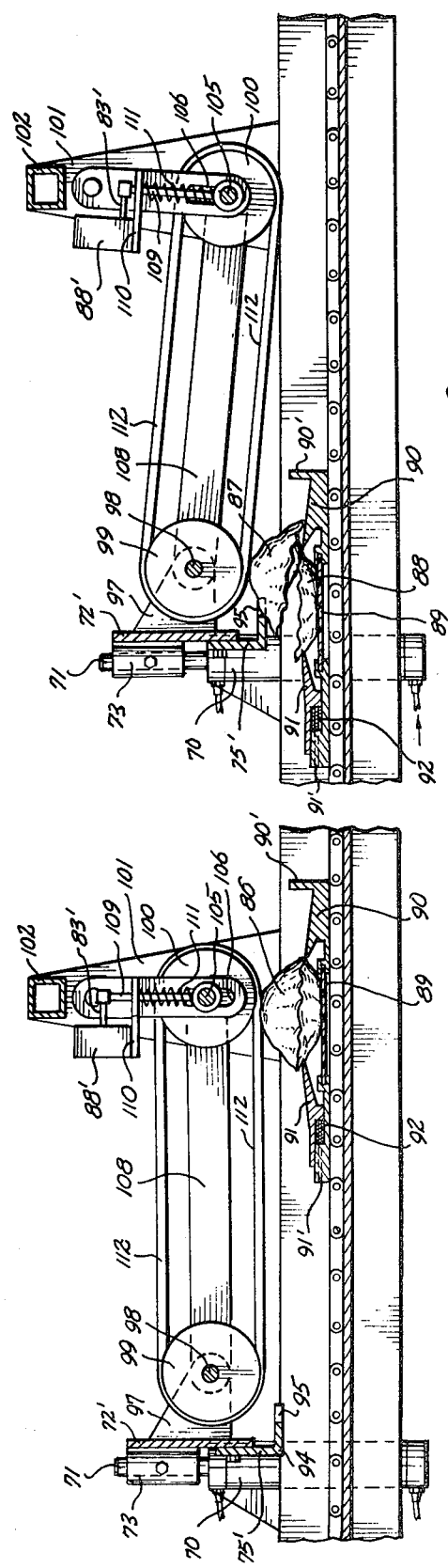

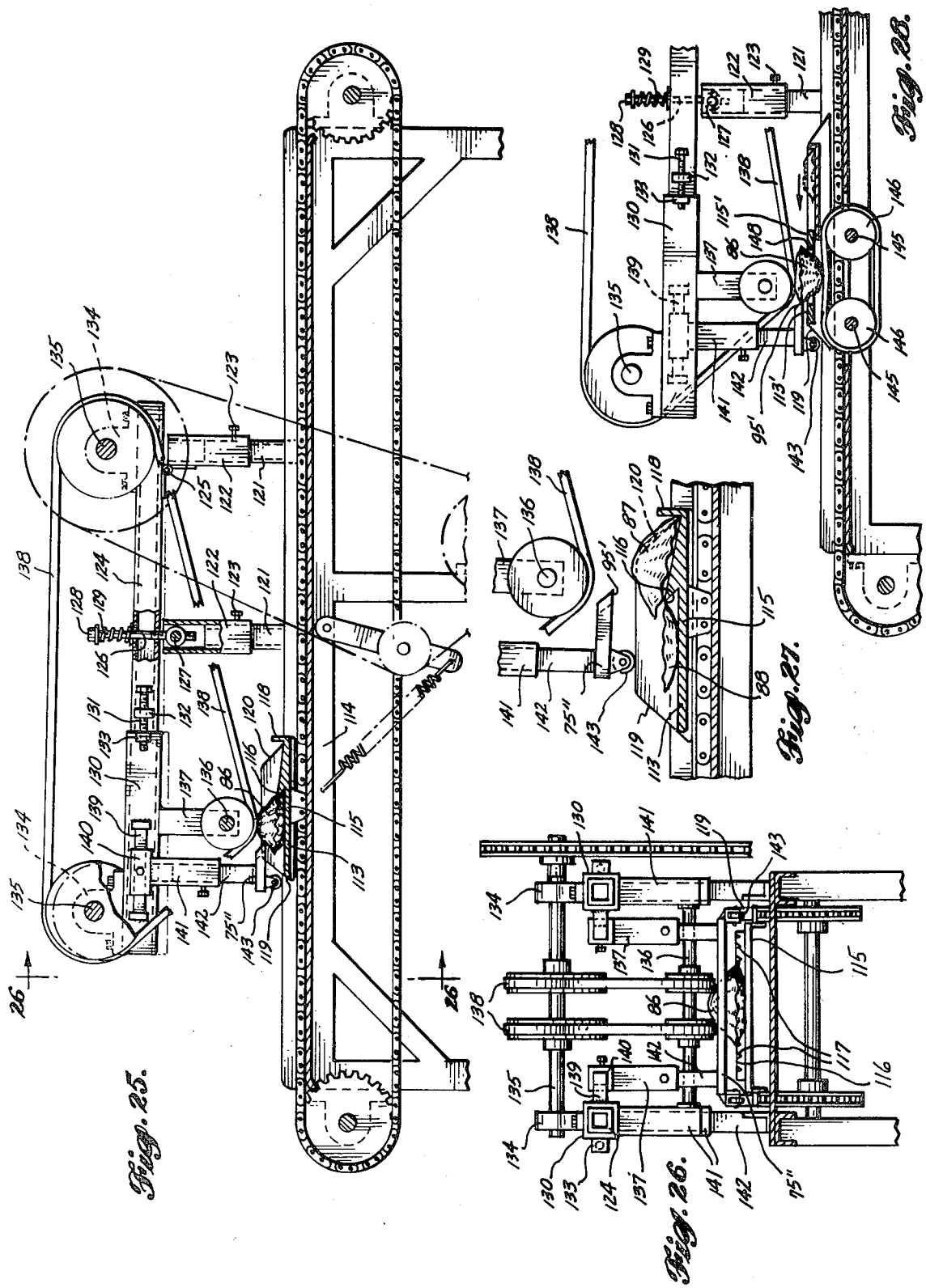

OYSTER PROCESSING METHOD

This is a division of application Ser. No. 773,187 filed Mar. 1, 1977 now U.S. Pat. No. 4,143,444.

BACKGROUND OF THE INVENTION

1. Field of the Invention

The present invention relates to apparatus for declustering and opening bivalves and the opening method.

2. Prior Art

Several United States patents disclose mechanical apparatus for processing bivalves which may or may not be first subjected to heat treatment. Oyster tumbling apparatus is shown in the following patents, but not for the purpose of breaking up clusters of oysters.

| Seal et al. | 2,823,414 |
| Lapeyre et al. | 3,007,801 |
| Lapeyre et al. | 3,037,237 |
| Jurisich | 3,238,560 |

Also the following patents apply a shearing force to the two oyster half shells.

| Plock | 2,473,609 |
| Gaelti et al. | 2,738,546 |
| Matzer et al. | 3,203,034 |
| Lapeyre et al. | 3,239,877 |

SUMMARY OF THE INVENTION

An object of the present invention is to provide oyster-processing apparatus which can be adjusted to accommodate various species of oysters.

Another object is to provide oyster-processing apparatus which will process oysters with minimum mutilation of the meat of the oysters.

It is also an object to provide oyster-processing apparatus which is adaptable to assembly line use.

The foregoing objects can be accomplished by providing an opening component including mechanical means for applying opposing forces to closed oyster half shells, thereby shearing the half shells apart.

BRIEF DESCRIPTION OF THE DRAWINGS

FIG. 2 is a side elevation and FIG. 3 an end elevation of a declustering drum in accordance with the present invention, each figure having parts shown in section and parts broken away.

FIG. 4 is a fragmentary side elevation of a modified declustering drum including a dislodging cage and FIG. 5 is a fragmentary section taken on line 5—5 of FIG. 4.

FIGS. 6 and 7 are fragmentary end elevations of modified declustering drums including other dislodging means.

FIG. 8 is a fragmentary section taken on line 8—8 of FIG. 7, FIG. 9 is a fragmentary section taken on line 9—9 of FIG. 7, and FIG. 10 is a fragmentary section taken on line 10—10 of FIG. 8.

FIG. 11 is a top perspective of an opening component in accordance with the present invention, and FIG. 12 is a fragmentary top perspective of a portion of the component shown in FIG. 11 with parts broken away. FIG. 13 is an end elevation and FIG. 14 is a longitudinal section of the opening component of FIG. 11. FIGS. 15, 16 and 17 are fragmentary longitudinal sections of the opening component of FIG. 11 in progressive stages of operation.

FIGS. 18, 19 and 20 are fragmentary longitudinal sections of the opening component of FIG. 11 modified to open oysters in body-down orientation, the separate figures illustrating progressive stages of operation.

FIG. 21 is a longitudinal section of another modified opening component. FIGS. 22, 23 and 24 are fragmentary longitudinal sections of the opening component of FIG. 21 in progressive stages of operation.

FIG. 25 is a longitudinal section of still another modified opening component and FIG. 26 is a section taken on line 26—26 of FIG. 25. FIG. 27 is a fragmentary elevation of the opening component of FIG. 25.

FIG. 28 is a fragmentary longitudinal section of the opening component of FIG. 25 further modified to open oysters in body-down orientation.

DETAILED DESCRIPTION

Figure 1:
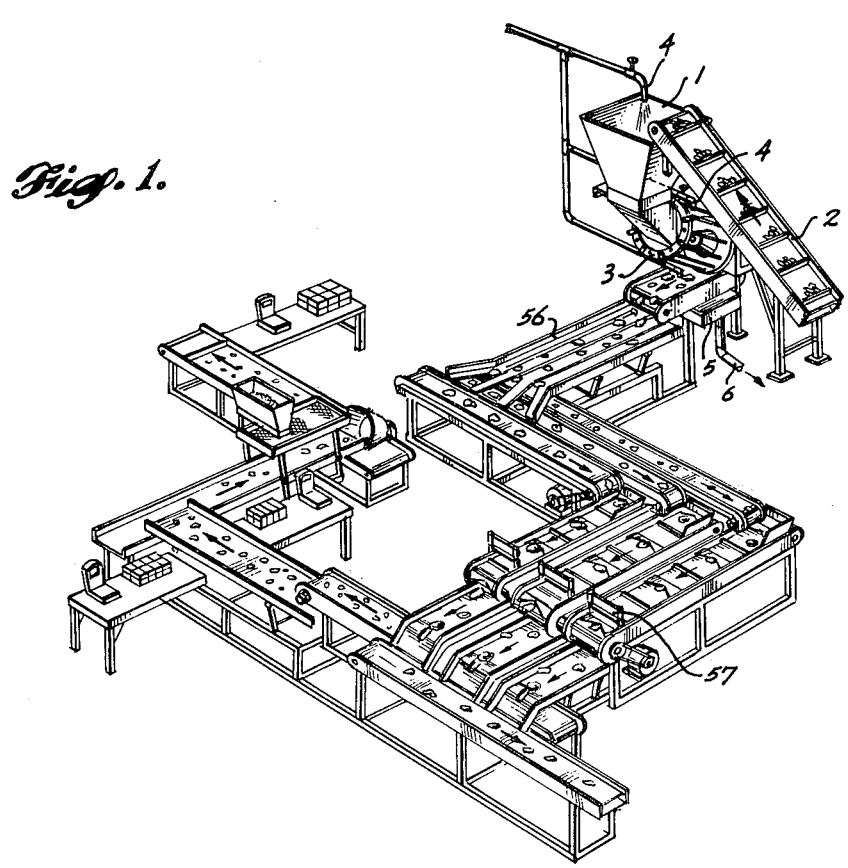
FIG. 1 is a top perspective of one possible layout of oyster processing apparatus in accordance with the present invention.

The outer part of an oyster consists of two half shells, one much more rounded and cuplike than the other. The more cuplike half shell will be referred to as the "body". The other half shell, which is relatively flat, will be referred to as the "lid".

The present invention can be used to process different species of oysters with only minor adjustments to accommodate for the difference in size of the various species. One possible assembly of the necessary components is shown in FIG. 1. Any suitable means can be provided to transport clusters of oysters to a hopper 1. Such means can include a standard belt conveyor 2. Oyster clusters travel through the hopper into a declustering drum 3 and nozzles 4 shower the clusters with water or solvent. Such water or solvent is collected in a pan 5 and discharged by a pipe 6 for disposal or for recycling through the nozzles.

The declustering drum 3 is rotatable to tumble oyster clusters against each other and to drop the clusters onto impact members for breaking up the oyster clusters. The impact members can be rods or bars extending longitudinally or transversely inside the drum. Alternatively, such members can be spike-shaped objects with their sharp points protruding inside the drum. Another alternative is to shape the drum itself in such a way that the inner circumference of the drum includes abrupt corners or bends. The impact members should present an impact surface area large enough to prevent breaking individual oysters, yet small enough to facilitate the declustering process. Separated single oysters fall from the drum through a slot large enough to allow single oysters to leave the drum yet small enough to retain clusters of oysters inside the drum.

As the drum rotates, oyster clusters on the inside of the drum will be tumbled against each other and against the impact members. Clusters will be broken into groups of fewer and fewer oysters and single oysters will be broken off the clusters and drop through the slot or slots in the drum. Naturally, any motion of the drum which will promote declustering and the passage of single oysters through the drum slots could be substituted for the rotary motion.

The declustering component shown in FIGS. 2 and 3 includes a base 7 supporting a motor 8. The armature shaft of the motor extends into a torque-adjusting gearbox 9. A motor pulley 10 is secured to the driven gear shaft 11 extending from the gearbox. Rotary power transferred from the motor through the gearbox to the motor pulley 10 is transmitted to a drum pulley 12 by belts 13. Such drum pulley is carried by a drum axle 14 which extends through a bearing in base 7 and is inclined upwardly from it.

The drum includes a collar 15 located at the center of a disk-shaped endpiece 16. A supporting cone 17 has its base attached to such endpiece by bolts 18. The drum axle 14 extends through collar 15 and through a hole in the tip of the supporting cone. The supporting cone and the endpiece are secured to the drum axle by a nut 19 screwed onto the threaded upper end portion of the axle. A ring-shaped endpiece 20 is connected to endpiece 16 by circumferentially spaced, transversely adjustable rods 21 and alternately arranged nonadjustable rods 22.

Oyster clusters can be fed into the drum through opening 23 of the endpiece ring 20, and the drum is inclined downwardly from such opening to facilitate retention of the clusters in the drum. One end of each nonadjustable rod 22 is firmly attached to the lower endpiece 16 and the other end of such rod is firmly attached to the upper endpiece 20. Each end of each adjustable rod 21 is attached to a separate mounting bracket 24 adjustable radially of an endpiece. As best seen in FIG. 3, each mounting bracket has a radial slot 25 through which a securing pin carried by an endpiece extends. Such pins preferably are bolts 26, as shown in FIGS. 2 and 3, which attach the brackets to the drum endpieces.

By sliding the brackets 24 radially in or out relative to bolts 26, the distance between an adjustable rod 21 and the adjacent nonadjustable rods 22—represented by the letter A in FIG. 3—can be increased or decreased. Such distance should be adjusted to be large enough to enable single oysters to fall between adjacent rods, as shown at the bottom of FIG. 3, yet small enough to retain clusters of oysters within the drum. In addition to defining the declustering drum slots, the rods serve as impact members presenting blunt yet small impact surface areas to clusters of oysters tumbled in the drum.

Because oyster clusters are irregular in shape, a cluster can become lodged in a declustering drum slot, as shown in the left portions of FIGS. 5, 6 and 7. Different means for dislodging such clusters are shown in FIGS. 4 and 5, FIG. 6, and FIGS. 7 to 10.

The dislodging means shown in FIGS. 4 and 5 includes a rotatable cage mounted above the declustering drum. An arm 27 extending upwardly from base 7 carries a sleeve 28 on its upper end. An upper axle 29 extends through the sleeve inclined substantially parallel to the drum axle 14. The upper portion of the upper axle carries the disloding case which includes star-shaped endpieces 30 and 31 having radial arms 32 connected by dislodging rods 33. Each endpiece has a central aperture, and a central spacer sleeve 34 extends between the central portions of the endpieces. The upper axle extends through the apertures of the endpieces and the central sleeve. A nut 35, on the upper end portion of the axle, secures the dislodging cage on the axle. The lower end portion of the upper axle carries an upper pulley 36.

It is desirable that the dislodging cage rotate in the direction opposite the direction of rotation of the declustering drum. For this reason, a second gearbox 37 is provided which houses reversing gearing 38 driving a pulley 39. As best seen in FIG. 4, the rotating power transmitted from the motor to the drum pulley 12 is further transmitted to reversing gearing 38, to pulley 39, and then to the upper pulley 36 by a belt 40.

As indicated by the arrows in FIG. 5, if the declustering drum rotates clockwise, the dislodging cage will rotate counterclockwise. The dislodging rods 33 will move into and out of the spaces between the declustering drum rods 21 and 22 much like gear teeth mesh with the grooves of a companion gear, thereby dislodging any oyster clusters stuck in such spaces. It would be possible to eliminate the means used to rotate the dislodging cage and rely instead on the gearlike action of the declustering drum rods and the dislodging cage star arms 32 to rotate the dislodging cage.

In the modified dislodging means shown in FIG. 6, an arm 4 extends upwardly from the base 7, on which arm is mounted a pair of fluid pressure jacks 42 and an actuating switch 43. Dislodging rods 44 extend parallel to the declustering drum rods and are attached to plunger arms 45 extending downwardly from the respective jacks 42. The switch is located so that, as the declustering drum rotates, each adjustable rod 21 triggers closing of the switch. Triggering of the switch causes both plunger arms 45 to be projected downward at opposite sides of the triggering rod, thrusting the arms and the dislodging rods into the declustering drum between the triggering rod 21 and the two fixed rods on opposite sides of such rod 21. Oyster clusters caught between the declustering rods will be struck by the rods 44 and dislodged.

The modified dislodging means shown in FIGS. 7 through 10 requires a mounting for the declustering drum adjustable rods different from that in the two previously discussed disloding means. In this arrangement the adjustable rods 21' serve as dislodging rods which are movable toward the inside of the declustering drum. As best seen in FIG. 9, each adjustable rod 21' extends a short distance through the outer end of an L-shaped mounting bar 46. The bar extends perpendicular to the axis of the rod toward the center of a drum endpiece 16 or 20 and through a slot 47 of a mounting box 48. The sides of the mounting box abut the drum endpiece except for the slot defined above. As shown in FIG. 10, the box is secured to the endpiece by bolts 49.

A threaded adjusting screw 50 having a head at each end extends from outside the bottom of the mounting box, through a tapped hole in the box bottom and through an untapped hole 51 in that portion of L-shaped bar 46 perpendicular to the drum endpiece. The latter hole is of a size sufficient to permit the bar to slide longitudinally of the pin. The bar is held away from the bottom of the mounting box and normally tight against the upper head of the adjusting pin by a compression spring 52. The distance between an adjustable rod 21' and the adjacent nonadjustable rods 22, labeled A in FIG. 9, can be adjusted by turning the adjusting screw to cause more or less of it to extend inside the mounting box.

As shown in FIG. 8, the upper end of an arm 27' extending upwardly from base 7 carries a sleeve 53. A wheel 54 is attached to the arm 27' by a short axle 55 extending through such sleeve. The size of the wheel is chosen so that, as the declustering drum rotates, the rim of the wheel will engage the end portions of the adjustable rods 21'. Each L-shaped bar 46 will be forced downward, compressing spring 52 and thrusting the adjustable rod 21' toward the center of the declustering drum. The adjustable rods are shown in downwardly thrust positions in FIGS. 7, 8 and 10. This movement will dislodge any oyster cluster stuck between the drum rods as they pass wheel 54.

The single oyster which have dropped through slots of the declustering drum can next be graded according to ranges of size. This can be done by a machine such as the vibrating grader 56 shown in FIG. 1, or by hand. It is desirable that the oysters be size-graded before they are transported to the opening components 57 so that each opening component operates on oysters of roughly the same size.

In the opening component shown in FIGS. 11 to 17, a conveyor belt 58 is supported by a conveyor frame which includes legs 59, longitudinal side plates 60 at opposite sides of the conveyor belt, longitudinal belt-supporting members 61 beneath the belt, crossbars 62 connecting members 61, belt height adjusting bolts 63 and adjusting bolt attaching lugs 64. Front flights 65 and rear flights 66 are secured to the conveyor belt by bolts 67 and 68, respectively. The top of each front flight is inclined upwardly in the direction the conveyor travels, and the leading edge 69 of each front flight is undercut to trap an oyster placed ahead of such flight. When viewed from above, the leading edge of the flight 65 is V-shaped with the sides of the V flared forward from the center of the belt to the outer edes of the belt in the direction the conveyor travels. The rear flight 66 is shown as a length of angle iron including a horizontal flange secured to the conveyor belt and a flange upstanding from the belt.

Mounted on the conveyor frame adjacent to opposite edges to the belt are two hydraulic jacks 70 including upwardly-extending plungers 71. A cross member 72 is mounted on the jack plungers by sleeves 73 carrying opposite ends of the cross member. Each sleeve encircles a jack plunger and is secured to such plunger by a set screw 74. A concussion bridge barrier 75 is secured to the cross member by bolts 76 extending through spaced parallel vertical slots 77 and screwed into tapped holes in the cross member. In this arrangement the concussion barrier extends transversely of the conveyor belt and above it. When the jack plungers are at rest in their lower positions, the distance from the bottom of the concussion barrier to the conveyor belt will be determined by the position of the bolts 76 in the slots 77.

Another feature of the opening component shown in FIGS. 11 to 16 is the assembly for triggering upward projection of the jack plungers 71 to raise barrier 75. A switch 78 and transversely spaced control rod mounting brackets 79 are attached to the downstream side of the concussion barrier with reference to the direction of movement of conveyor belt 58. As best seen in FIG. 14, the switch includes a downwardly projecting button 80 and rod support lugs 81 also projecting downward. Returning to FIG. 11, a turnable control rod 82 extends substantially horizontally through holes in the mounting brackets 79 and lugs 81. An activating tongue 83 is attached to the control rod and projects upstream from it so that turning of the rod 82 will swing the tongue to actuate switch 78. The swinging end portion of the tongue is directly under the switch button.

Control rod 82 has end portions 84 bent at right angles to its transverse central portion so as to extend upstream. One such end portion projects past each end of the concussion barrier 75. A sensor bar 85 extending transversely of belt 58 ahead of the barrier has one end carried by one control rod end portion and the other end carried by the other control rod end portion. The upstream margin of the sensor bar is curved upward to facilitate entry of an oyster under it. When the triggering assembly is at rest in its lower position the sensor bar is located at a height above the conveyor belt so as to be in the path of the upper portion of an oyster carried on belt 58.

Progressive stages in the operation of the opening component are illustrated in FIGS. 15, 16 and 17. An oyster 86 is placed on the downstream side of a front flight 65 of belt 58, preferably lid down, with the oyster abutting the leading edge of such flight. The V-shaped identation in the flight leading edge holds the oyster in the center of the belt. Since the upper surface of the front flight is inclined rearward and downwardly, the height of the leading edge varies from a minimum at the center of the conveyor to a maximum at the sides of the conveyor. Such minimum and maximum heights can be chosen so that the lid of an oyster placed ahead of a front flight will be engaged by the front flight leading edge at approximately the joint between the oyster half shells. The lid of an oyster slightly larger than the average size of oysters to be opened will be engaged farther from the center of the flight where the leading edge is higher. The lid of an oyster slightly smaller than average will be engaged at locations closer to the center of the flight where the flight leading edge is lower.

The oyster is transported toward concussion bridge barrier 75 by the flight 65 to contact sensor bar 85. As best seen in FIG. 15, the sensor bar will be wedged upward by the forwardly-moving oyster to swing the switch-actuating tongue 83 upward. Such tongue will reciprocte the switch button 80, thereby triggering upward projection of the jack plungers 71. The height of the concussion bridge barriers 75 has been adjusted by the slots 77 and bolts 76 so that the bottom edge of the barrier plate is struck forcibly by the portion of the leading side of the upper oyster shell just above the joint between the lid and body, which arrests forward movement of the upper shell. As the oyster is boxed between the leading edge of the front flight 65 and the concussion bridge barrier 75, the moving flight applies a downstream force on the oyster lid 88 while the concussion bridge barrier applies an upstream reaction force on the arrested shell body 87 so that the oyster half shells are subjected to an abrupt, strong shearing jolt which disconnects or parts the shell parts and shell-holding muscles. The disconnected body 87 and lid 88 are shown in FIG. 16.

At this instant, the jack plungers are in the process of being projected upwardly by the jacks so that the concussion bridge barrier 75 is being moved upward. The barrier is still low enough, however, so that it continues to engage the body shell 87 as shown in FIG. 16. The separated body slides down the rearwardly inclined top of the front flight 65 by continuing travel of the conveyor. As shown in FIG. 17, eventually rear flight 66 will engage the body and transport it downstream away from the concussion plate while the lid continues to be moved by the front flight 65.

The concussion bridge barrier 75a shown in FIG. 12 has a concave bottom of a shape roughly corresponding to the shape of an oyster body so that the reaction force will be exerted on the body over a substantial area rather than only at one point. The sensor bar 85 used with such a barrier could also be concave upward.

Instead of the oysters being placed on the conveyor their bodies up, as described and shown in FIGS. 14 to 17, the opening component could operate with the oyster lids up and bodies down. In such case, as best seen in FIGS. 18, 19 and 20, the front flight 65 would have a higher leading edge and the concussion bridge barrier 75 would be adjusted upward relative to the cross member 72 by adjusting the vertical slots and bolts 76 to assure that the opposed shearing forces would be exerted on the oyster as close as possible to the joint between the lid and body. Similar adjustments can be made for different sizes and species of oysters.

The modified opening component shown in FIGS. 21 to 24 uses a standard chain conveyor including two parallel endless transporting chains. The oyster-carrying apparatus includes a flexible tray or reaction member 89 bridging between two flights 90 and 91, each of which flights bridges between and is carried by the transporting chains. The upstream flight 90 is shaped similarly to the front flight 65 of FIG. 11, except that flight 90 has an upwardly extending flange 90' on its trailing edge corresponding to the angle rear flight 66 in FIG. 11. The downstream flight 91 includes an upstream edge 93 which is V-shaped in plan and flared in the upstream direction. In FIG. 21, an oyster 86 is shown as being supported lid down by tray 89 between the two flights 90 and 91. Both the leading edge of flight 90 and the upstream edge 93 of flight 91 engage the oyster approximately at the joint between the lid and body, edge 93 being held against the oyster by a compression spring 92 anchored against a flange 91' of flight 91.

As in the previously described embodiment, this opening component includes a pair of hydraulic jacks mounted at opposite sides of the conveyor with a cross member 72' extending between and carried by the jack plungers. Such cross member is secured to the plungers by sleeves and set screws as described in connection with FIG. 11. A concussion bridge barrier 75' is adjustably mounted on the cross member by bolts extending through vertical slots in the barrier as also described in connection with FIG. 11. In this component the barrier is secured to the downstream side of the cross member and has a right angle bend 94 directed upstream to form an impact edge 95. Such impact edge is V-shaped and flared in the upstream direction in plan.

Brackets 97, extending upstream from the outer end portions of cross member 72', carry a downstream axle 98 which in turn carries a downstream pulley 99 over the center of the conveyor. An upstream pulley 100 is mounted to enable it to rise and fall relative to the conveyor. A mounting frame for the upstream pulley includes: two upwardly extending frame supports 101 adjacent to opposite sides of the conveyor; a cross member 102 connecting the upper portions of the supports; a shaft 103 extending between the support upper portions below the cross member; and two hanger arms 104 depending from the shaft, one on each side of upstream pulley 100. The outer ends of an upstream axle 105, carrying the upstream pulley at its center, extend through vertical slots 106 in the hanger arms. Each end of the axle has a cap 107 preventing an axle end from being pulled out of an arm slot.

In this arrangement, the upstream axle 105 can move vertically in the slots 106 so that the upstream pulley is also free to move vertically. The spacing between the upstream and downstream axles is fixed by spacer bars 108. In addition, two rods 109, connected to axle caps 107, extend upward through brackets 110 attached to the hanger arms 104. The upper end of each rod is capped above its bracket 110. Compression springs 111 encircling rods 109 have their opposite ends bearing against the axle caps 107 and the brackets 110 to bias the upstream pulley downward. a belt 112 connects the pulleys 99 and 100. As best seen in FIG. 21, a chain and sprocket drive drives belt 112 in synchronism with the chain conveyor carrying flights 90 and 91.

Progressive steps in the operation of this oyster opening component are illustrated in FIGS. 22, 23 and 24. The upper shell of an oyster 86 is carried by the tray 89 to engage belt 112. The oyster moves under the upstream pulley 100, wedging the pulley upward in opposition to springs 111, and moving rods 109 upward relative to the brackets 110. The weight of the pulley supporting assembly as well as springs 111 press the oyster against tray 89. A triggering assembly including an activating tongue 83', attached to the upper portion of one of the rods 109, throws a switch 88' to start a time delay for energizing the hydraulic jacks to begin the upward projection of the jack plungers 71. The held-down oyster will next strike the impact edge 95 of the concussion bridge barrier before it begins its upward movement. Just after the oyster strikes the barrier the jacks are actuated to release the downward pressure exerted by the belt on the oyster and to lift the barrier above the oyster. As shown in FIG. 24, the oyster body 87 is separated from the oyster lid 88 by the shearing jolt. The body slides down the inclined upper surface of the upstream flight 90 until engaged by the upwardly extending flange 90' by which such body will be carried downstream away from the opening component. The flange is preferably located on flight 90 a distance less than the diameter of an oyster from the flight leading edge so that the oyster meat, which normally remains in the oyster body portion, is not dragged across the sharp trailing edge of the oyster lid.

The modified opening component shown in FIGS. 25 to 27 also uses a double chain conveyor to transport oysters to be opened. An oyster-carrying flight 113 bridges and is carried by the conveyor chains. The flight includes a horizontal tray portion 115 and a joint-engaging leading edge 116. In this embodiment, the leading edge 116 is not V-shaped, but instead includes short teeth 117, best seen in FIG. 26, extending from edge 116 in a downstream direction. The flight also includes a trailing flange 118 which performs the same functions as the rear flight 66 of FIG. 11 and the flange 90' of FIG. 21. Cam lift ramps 119 and down ramps 120, formed as part of flight 113, are located over the conveyor chain.

Mounted on each side of the conveyor frame are two upwardly extending supporting columns 121 carrying upwardly extending sleeves 122. The sleeves are adjustably secured to the columns by set pins 123. Belt-supporting frame members 124 extend longitudinally of the conveyor over sleeves 122. The upstream portion of each frame member is attached to an upstream sleeve by a hinge 125. The middle portion of such frame member is secured to a downstream sleeve by a pin 126 carried by a shaft 127 in the downstream sleeve. Pin 126 extends upward from the downstream sleeve through holes in the lower and upper sides of the frame member and ends above the frame member in a cap and washer 128. A compression spring 129 encircles the upper portion of pin 126 and biases the frame member downward. The downstream portion of each frame member carries a longitudinal sleeve 130. The position of the sleeve on the frame member can be adjusted by a threaded pin 131 extending through a tapped bracket 132 on the frame member and a tapped bracket 133 on the sleeve.

Axle brackets 134 are mounted on the upper sides of the upstream end portions of frame members 124 and on the upper sides of the downstream end portions of longitudinal sleeves 130. Upper axles 135 extend transversely of the conveyor between the axle brackets. A lower axle 136 extends between arms 137 extending downward from the longitudinal sleeves. As best seen in FIG. 26, lower axle 136 and upper axles 135 each carry two pulleys with one pulley offset a short distance from an axle center and the other pulley offset an equal distance to the other side of the axle center. Two endless belts 138 connect the pulleys.

The inner side of each longitudinal sleeve 130 includes a longitudinal adjustment bar 139 supporting the concussion bridge barrier assembly which includes channel flanges 140 slidable along the length of the bar, support sleeve 141 extending downward from the flanges and receiving bridge barrier support arms 142, to which are attached the outward end portions of a horizontal concussion bridge barrier 75''. Cam followers in the form of small wheels 143 extend downward from the outward ends of the concussion bridge barrier and are disposed above the conveyor chains in alignment with cam ramps 119 and 120.

The operation of this opening component is quite similar to the operation of the components previously described, the major difference being that in this component the lifting action of the bridge barrier is achieved by cam ramps rather than by hydraulic jacks. Flight 113 carrying an oyster 86 approaches the bridge barrier and the upper oyster half shell first engages belts 138. Such belts press he oyster against the oyster-carrying apparatus due to the weight of their supporting frame and the force of spring 129. Nevertheless, as the oyster is wedged under the belts the entire supporting frame is forced upward. Concussion barrier 75'' is positioned a set distance below belts 138 and is struck sharply by the upper half shell of the held-down oyster. Shortly after the shearing jolt cam follower wheels 143 engage the cam lift ramps 119 forcing the barrier upward to clear the oyster. The shearing jolt will separate the lid from the body and the body will slide down the inclined upper surface of flight 113. Flange 118 upstanding from flight 113 carries the body downstream away from the opening component.

As best seen in FIG. 27, if the shearing jolt exerted on the oyster half shells is not sufficient to disconnect the lid and body, the raising of the bridge barrier will still enable the unopened oyster to pass beneath the barrier. In the same installation it may be desirable to provide two openingcomponents in series on the same conveyor frame so that oysters not opened by impact with the first bridge barrier would be opened by impact with a second bridge barrier. Alternatively, unopened oysters can simply be run through the same opening component again. Another alternative is to provide a second opening component adjusted to open smaller oysters so that oysters not opened by impact with the first bridge barrier would strike the second bridge barrier nearer the joint between the oyster half shells.

FIG. 28 shows one way the opening component of FIGS. 25 to 27 can be modified to accomodate oysters in a body-down configuration. Two axles 145 extend across the conveyor below the conveyor chains. Pulleys 146 are carried at the center of the axles and a belt 147 connects the pulleys. A front flight 113' includes a horizontal tray portion 115' having an oyster-carrying hole 148 in the center of the tray. The hole is large enough to permit the body of an oyster to extend a substantial distance through the hole yet not so large as to permit the oyster to pass all the way through the hole. Alternatively, the horizontal tray portion could be formed by two crossbars with a slot between the bars of a width the same as the diameter of hole 148. As the front flight nears the bridge barrier, the oyster body protruding through the hole will engage the lower belt 147 and be forced against the upper belts 138. Bridge barrier 75'' is positioned a set distance down from belts 138 and is adjusted so that the oyster strikes the barrier at the joint between the oyster half shells, thereby opening the oyster in the same manner as the component of FIGS. 25 to 27.

After the oyster shells have been sheared apart in the manner stated above, the meat will be exposed for removal from one of the shells, usually the body shell, in any desired manner either manually or mechanically.

I claim:

1. The method of opening an oyster which comprises supporting the oyster on a support member engaging a central portion of the exterior of one half shell of the oyster, engaging an edge portion of the exterior of one half shell of the oyster with a first force-applying member connected to the support member, and driving the support member and the first force-applying member relatively toward a second force-applying member to engage the second force-applying member against the edge portion of the oyster half shell not engaged by the first force-applying member which latter edge portion is generally opposite the shell edge portion engaged by the first force-applying member for applying shearing force to the oyster for separating the oyster half shells.

2. The method defined in claim 1, including supporting the oyster on a generally horizontally extending support member such that the oyster rests on the support member with the plane between the oyster half shells extending generally horizontal.

3. The method defined in claim 1, including supporting the oyster on the support member by engaging the oyster between the support member and a hold-down member that engages a central portion of the exterior of the oyster half shell not engaged by the support member.

4. The method defined in claim 1, including applying the shearing force to the oyster without insertion of a sharp pointed member between the oyster half shells.

5. The method defined in claim 1, 2, 3 or 4, including driving the second force-applying member abruptly against the edge portion of the oyster for applying an abrupt shearing jolt to the oyster.

* * * * *